United States Patent [19]
Klein et al.

[11] Patent Number: 5,132,893
[45] Date of Patent: Jul. 21, 1992

[54] VOLTAGE SUPPLY CIRCUIT

[75] Inventors: Johannes-Artur Klein; Bertram Koelbli, both of Frankfurt am Main, Fed. Rep. of Germany

[73] Assignee: Honeywell Inc., Minneapolis, Minn.

[21] Appl. No.: 735,976

[22] Filed: Jul. 25, 1991

[30] Foreign Application Priority Data

Jul. 25, 1990 [DE] Fed. Rep. of Germany ....... 4023612

[51] Int. Cl.$^5$ ............................................. H02M 13/26
[52] U.S. Cl. ...................................... 363/49; 363/89; 323/901
[58] Field of Search ................ 363/49, 89; 323/901, 323/266, 270, 271

[56] References Cited

U.S. PATENT DOCUMENTS

| | | | |
|---|---|---|---|
| 3,7051328607 | 5/1973 | Hawkins | 363/89 |
| 4,016,461 | 4/1977 | Roland | 361/18 |
| 4,195,335 | 3/1980 | Murakami et al. | 363/49 |
| 4,206,397 | 6/1980 | Dahlke | 323/273 |
| 4,719,553 | 1/1988 | Hinckley | 363/49 |
| 4,893,228 | 1/1990 | Orrick et al. | 363/89 |
| 4,941,076 | 7/1990 | Diaz | 363/49 |

Primary Examiner—Steven L. Stephan
Assistant Examiner—Ben Davidson
Attorney, Agent, or Firm—Craig J. Lervick

[57] ABSTRACT

In order to provide a voltage supply circuit with high efficiency, high control quality and with optimum utilization of the present energy the circuit comprises in combination a switching controller and a longitudinal voltage controller and a static starter circuit is provided, which supplies via a transistor the electronic components of the circuit with energy until a predetermined voltage is attained.

17 Claims, 1 Drawing Sheet

VOLTAGE SUPPLY CIRCUIT

BACKGROUND OF THE INVENTION

The present invention relates to a voltage supply circuit for applications which require a highly accurate, highly efficient output voltage for varying input voltages.

High efficiency voltage supplies utilizing switching controllers have a ripple in the output voltage. Often this rippled output voltage may not be tolerated by certain loads. In addition, the response of such switching controllers to varying input voltages may be such that those switching controllers are inappropriate for certain applications.

Also known in the art are linear controllers which show nearly no ripple in the output voltage. However these linear controllers are of low efficiency due to the commonly large difference between input and output voltages at nearly the same input and output currents. Usually the efficiency is better when the difference between the input and output voltage becomes smaller.

SUMMARY OF THE INVENTION

It is an object of the present invention to provide a voltage supply circuit which allows optimum utilization of energy with a highly accurate output.

The present voltage supply circuit preferably serves to energize the fuse of subcaliber ammunition. The electronic fuse circuit must be supplied with energy from a storage capacitor during its function phase of approximately 10 seconds. This storage capacitor is charged during a short energy transmission phase, which occurs before the requested function phase. Charging of the storage capacitor is accomplished by exposing a receiving coil to a high frequency magnetic field, and rectifying the received induced voltage.

In order to start the operation of the voltage controller, consisting of a switching controller and a linear controller, at a well defined point of time, a static starter circuit is provided which is operated for a short time during the energy transmission phase. During the functional phase of the voltage controller no additional energy for operating the starter circuit is required.

BRIEF DESCRIPTION OF THE DRAWING

The operation and design of the voltage supply circuit will be better understood by reading the following description in conjunction with the drawing, in which FIG. 1 schematically illustrates the voltage supply circuit.

DETAILED DESCRIPTION OF THE INVENTION

Figure 1:
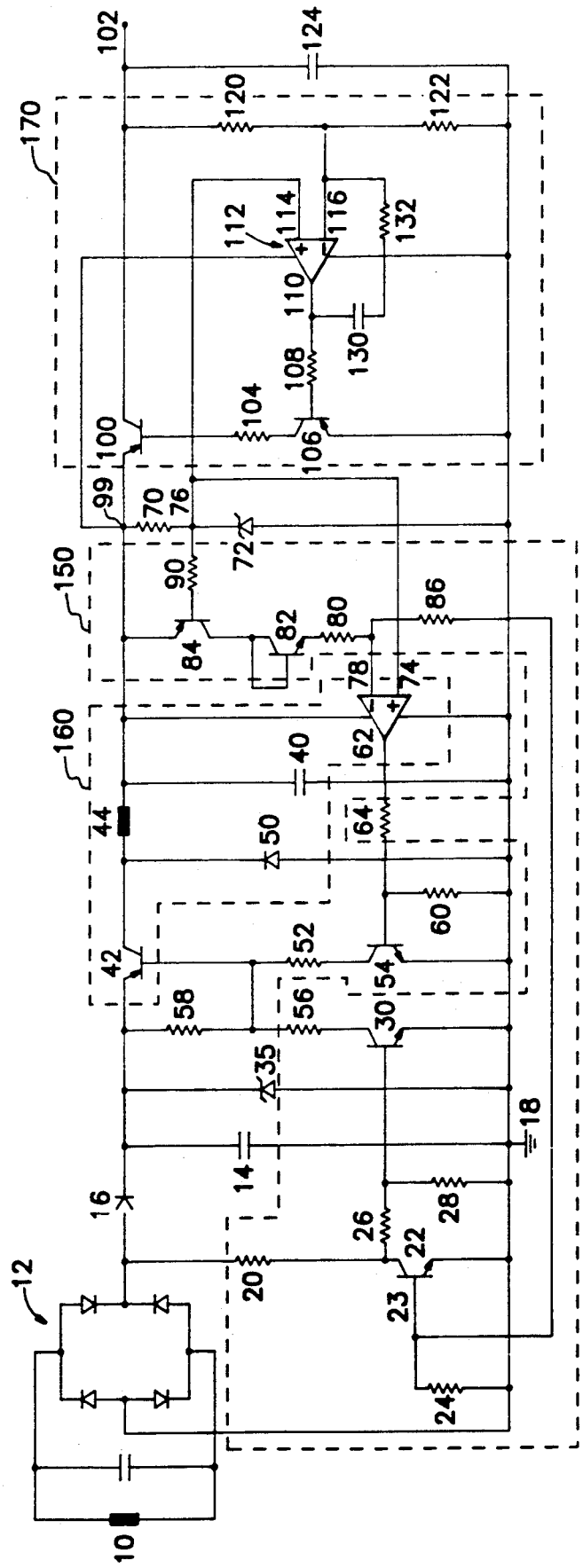

During a short energy transmission phase of approximately 50 ms. a receiving coil 10 is exposed to a high frequency magnetic field. The AC voltage induced in the receiving coil 10 is rectified by means of a full-wave bridge rectifier 12. The rectified voltage charges a first capacitor 14 via a first diode 16, which is connected to a first tap of rectifier 12. A second terminal of capacitor 14 together with a second tap of bridge rectifier 12 is connected to ground 18. Between both taps of bridge rectifier 12 is connected the series combination of a resistor 20 and the collector-emitter path of a first transistor 22. The base 23 of first transistor 22 is connected to ground 18 via a resistor 24. The series connection of two resistors 26 and 28 connect the collector of transistor 22 to ground 18 and the voltage divider tap of resistors 26 and 28 is connected to the base of a second transistor 30. The collector-emitter path of second transistor 30 together with the series connection of two resistors 56 and 58 are connected in parallel to first capacitor 14. First diode 16 decouples the branch containing first transistor 22 from capacitor 14. A Zener diode 35 is connected in parallel with capacitor 14 for limiting the voltage. A second capacitor 40, in series combination with a third transistor 42 and a second induction coil 44 is connected in parallel with capacitor 14. A second diode 50 is connected in parallel to the series combination of induction coil 44 and the capacitor 40. The base of third transistor 42 is connected to ground 18 via the series connection of a resistor 52 and the collector-emitter path of a fourth transistor 54. The base of third transistor 42 is further connected to ground via a resistor 56 and the collector-emitter path of second transistor 30. A resistor 58 is arranged between the base and the emitter of third transistor 42. The base of fourth transistor 54 is connected to ground via a resistor 60 and also is connected to the output of a comparator 62 via a resistor 64.

A voltage divider consisting of a resistor 70 and a Zener diode 72 is connected in parallel with capacitor 40. The non-inverting input 74 of comparator 62 is connected to the tap 76 of this voltage divider. The inverting input 78 of the comparator 62 is connected to capacitor 40 and coil 44 via a resistor 80, a fifth transistor 82 operating as a diode and the collector-emitter path of a sixth transistor 84. Inverting input 78 is further connected to ground via a resistor 86, and resistor 24 or first transistor 22. Fifth transistor 82, operating as a diode serves, to compensate for the temperature behavior of the base-emitter path of first transistor 22. The base of sixth transistor 84 is connected via a resistor 90 to the tap 76 of a voltage divider consisting of resistor 70 and Zener diode 72.

A control transistor 100 is connected with its emitter-collector path between capacitor 40 and an output terminal 102. The base of control transistor 100 is connected to ground via a resistor 104 and the collector-emitter path of a seventh transistor 106. The base of seventh transistor 106 is connected via resistor 108 to the output 110 of an amplifier 112.

Amplifier 112 has its non-inverting input 114 connected to tap 76 of voltage divider 70, 72 and has its inverting input 116 connected to a voltage divider consisting of the series combination of two resistors 120, 122. The voltage divider consisting of resistor 120 and resistor 122 is connected between output terminal 102 and ground 18, with resistor 120 connected to output terminal 102. Furthermore a capacitor 124 is connected in parallel with the output terminal 102 for smoothing the output voltage. The output 110 of the amplifier 112 is fed back to the inverting input 116 via the series connection of a capacitor 130 and a resistor 132 in order to provide PI control for the voltage control circuit.

The components of the voltage control circuit can be separated into three functional groups: (1) a static starter circuit 150, (2) a switching controller 160, and (3) a linear controller 170. Static starter 150 is made up of first transistor 22, second transistor 30, fifth transistor 82 and sixth transistor 84, along with resistors 20, 24, 26, 28, 60 and 64. Switching controller 160 is made up of third transistor 42, coil 44, capacitor 40, diode 50, and comparator 64. Lastly, linear controller 170 is made up of control transistor 100, seventh transistor 106, amplifier 112, capacitor 130, and resistors 104, 108, 120, 122, and 132.

From the above described circuit the following operation results:

The high frequency carrier voltage received by receiving coil 10 is rectified by bridge rectifier 12 and controls second transistor 30 via the resistors 20 and 26. At the same time capacitor 14 is charged via decoupling diode 16. If the voltage across capacitor 14 exceeds the value of 4.5 V, then second and third transistors 30 and 42 become conducting so that capacitor 40 is charged via induction coil 44 to the voltage level of capacitor 14. The switching controller at this time is not in operation since third transistor 42 is controlled in its conducting state via second transistor 30 so that operation of the switching controller is inhibited.

If the voltage across capacitor 40 rises to a value of 1.1 V then comparator 62 starts to work. Inverting input 78 of comparator 62 is connected to ground via resistors 86 and 24 and non-inverting input 74 of comparator 62 is connected to the potential of Zener diode 72 (approximately 0.9 V). When the voltage at non-inverting input 74 becomes sufficiently high, the output of comparator 62 therefore becomes positive and controls fourth transistor 54 in its conduction state. Due to the parallel arrangement of second and fourth transistors 30 and 54 the additional control of fourth transistor 54 results in an increase of the base current of third transistor 42 so that the voltage drop over the emitter-collector path of third transistor 42 is further reduced.

Parallel with the rising voltage across capacitor 40 an amplifier 112 starts to adjust its working point. The inverting input 116 of amplifier 112 is connected to ground via resistor 120 and non-inverting input 114 is connected to the potential predetermined by Zener diode 72 (approximately 0.9 V). The output of amplifier 112 therefore becomes positive and controls seventh transistor 106 in its conducting state so that control transistor 100 becomes also conducting and the voltage at output 102 may rise.

If the voltage over capacitor 40 rises to 2.2 V then the voltage drop over resistor 70 increases accordingly. This voltage drop then is sufficient to control sixth transistor 84 in its conducting state. Via the emitter-collector path of sixth transistor 84, current now flows into the voltage divider consisting of fifth transistor 82, resistor 80, resistor 86 and first transistor 22 so that with an according current rise over the voltage divider, first transistor 22 becomes conducting and second transistor 30 is switched off. Now the switching controller is enabled. With the further rise of the voltage over capacitor 40, the voltage at inverting input 78 of the comparator 62 rises. If this voltage exceeds the voltage at non-inverting input 74 of the comparator 62 the output of the comparator switches from the high potential to the low potential whereby third and fourth transistors 54 and 42 are inhibited. By the quick switching-off an according self-induction voltage is produced within induction coil 44. Via diode 50 the current circuit is closed to ground so that the electrical energy of the induction coil 44 may be transferred to the capacitor 40.

The voltage over capacitor 40 subsequently decreases until the voltage at inverting input 78 falls below the voltage predetermined by Zener diode 72. Then the procedure starts again. The switching frequency of the switching controller herewith only depends from the value of the input voltage and from the output current.

The voltage pre-controlled by the switching controller, at a switching controller output 99 subsequently is leveled and stabilized on the desired voltage value by means of the longitudinal controller which requires only a small difference between the input and output voltage. If the voltage over the voltage divider comprising resistor 120 and resistor 122 rises to a value which is predetermined by the Zener diode 72, the output voltage of amplifier 112 becomes smaller, which results in reducing the base current of seventh transistor 106 and control transistor 100. Therefore the voltage drop over the emitter-collector path of control transistor 100 increases and at the same time the output voltage at output 102 decreases. In order to attain the desired precision of adjustment and to improve the control behavior the longitudinal controller has a P.I. (proportional integrating) control action. That is, the output is proportional to a linear combination of the input and the time integral of the input.

What is claimed is:

1. A voltage supply circuit, comprising:
    first storage capacitor chargeable by a high frequency AC voltage;
    control circuit connected to said first storage capacitor, said control circuit comprising switching controller means (42, 44, 40, 50, 62) for transforming the voltage of said first storage capacitor (14) into a voltage on a second storage capacitor (40) by switching said switching controller means, a linear voltage regulator (100, 112, 106) connected to said second storage capacitor (40) for providing an output voltage at an output terminal (102), and static starter circuit means (82, 84, 30, 22, 86, 20, 26, 64, 90, 80) for inhibiting said switching of said switching controller means until a predetermined voltage has built up on said first and second storage capacitors (14, 40).

2. The voltage supply circuit according to claim 1, further comprising:
    a series connection of a third transistor's (42) emitter-collector path and an inductive coil (44), connected between said first storage capacitor (14) and said second storage capacitor (40),
    a parallel combination of a second and a fourth transistor connected to the base of said third transistor (42), (30, 54) and whereby said second transistor (30) serves to enable said third transistor (42) and said fourth transistor (54) serves to inhibit said third transistor (42).

3. The voltage supply circuit according to claim 2, wherein said second transistor (30) is inhibited by means of a voltage divider (84, 82, 80, 86, 22, 26, 28) and said fourth transistor (54) is inhibited by the output signal of a comparator (62) which compares the voltage over said second storage capacitor (40) to a reference voltage.

4. The voltage supply circuit of claim 1 further comprising:
    a control transistor (100) having its emitter-collector path connected between said second storage capacitor (40) and the output (102) of the voltage supply circuit;
    an amplifier means (112) having its output connected to the base of said control transistor, for comparing the output voltage (102) to a predetermined reference voltage.

5. The voltage supply circuit according to claim 4, further comprising a series connection of a capacitor (130) and a resistor (132) connected between the output of said amplifier means (112) and the inverting input (116) of said amplifier means (112).

6. The voltage supply circuit according to claim 1, further comprising:
the series combination of a first transistor (22) and a first resistive means (20) connected in parallel with said first storage capacitor (14)
the series combination of a second transistor (30) and a second resistive means (56, 58) connected in parallel with said first storage means;
a first voltage divider comprising said first resistive means (20) and a third resistive means (26, 28), said third resistive (26, 28) means connected in parallel with said first transistor (22);
a second voltage divider (24, 86, 80, 82, 84) connected in parallel with said first storage capacitor (14)
whereby a portion of said first voltage divider is shorted to ground by said first transistor (22) when voltage across said second storage capacitor reaches a predetermined value.

7. A voltage supply circuit comprising:
a first storage capacitor (14) being charged by a high frequency AC voltage;
a switching regulator (42, 44, 40, 50, 62) for transforming the voltage of said first storage capacitor (14) into a voltage on a second storage capacitor (40) connected in parallel to said switching regulator, wherein said switching regulator comprises the series connection of the emitter/collector path of a third transistor (42) and of an inductive coil (44) between said first storage capacitor (14) and said second storage capacitor (40), and said transformation of voltage on said first storage capacitor to a voltage on said second capacitor is achieved by switching said third transistor;
a linear voltage regulator (100, 112, 106) connected to said second storage capacitor (40) for providing an output voltage at an output (102), wherein said linear voltage regulator comprised the emitter/collector path of a control transistor (100) between said second storage capacitor (40) and said output (102) with the base of said control transistor being controlled by an amplifier (112) which compares the output voltage to a predetermined reference voltage; and
a static starter circuit (82, 84, 30, 22, 86, 20, 26, 64, 90, 80) for inhibiting the switching of said switching regulator by steering said third transistor (42) in its conducting state until a predetermined voltage has built up on said storage capacitors (14, 40).

8. The voltage supply circuit according to claim 7, wherein said starter circuit comprises:
a first initially inhibited transistor (22) and a second initially conducting transistor (30), both transistors (30, 22) being connected with their collector/emitter-paths in parallel to said first storage capacitor (14), a first voltage divider (20, 26, 28) and a second voltage divider (14, 86, 80, 82, 84, 22) whereat a portion of said first voltage divider (R5, R6, R7) is short-circuited to ground by said second storage capacitor when the voltage over said second storage capacitor (40) reaches a predetermined value thereby inhibiting said second transistor 30.

9. The voltage supply circuit according to claim 8, wherein the base of said third transistor (42) is controlled by collector/emitter-path of said second initially conducting transistor (30) and by the collector/emitter-path of a fourth transistor (54) arranged in parallel to said second transistor (30) and wherein said second transistor (30) serves to enable said third transistor (42) and said fourth transistor serves to inhibit said third transistor (42).

10. The voltage supply circuit according to claim 9, wherein said second transistor (30) is inhibited by means of a voltage divider (84, 82, 80, 86, 22, 26, 28) and said fourth transistor (54) is inhibited by the output signal of a comparator (62) which compares the voltage over said second storage capacitor (40) to a reference voltage.

11. The voltage supply circuit according to claim 10, wherein the series connection of a capacitor (130) and a resistor (132) is connected between the output and the inverting input of an amplifier (112).

12. A voltage supply circuit, comprising:
first storage capacitor (14) chargeable by a high frequency AC voltage;
switching regulator means (42, 44, 40, 50, 62) connected to said first storage capacitor (14), having a third transistor (42) connected between said first storage capacitor (14) and a switching regulator means output (99), said switching regulator means for transforming a voltage on said first storage capacitor (14) to a voltage at said output (99) of said switching regulator means by switching said third transistor (42) in a predetermined manner;
linear voltage regulator means (100, 112, 106) connected to said output (99) of said switching regulator means for providing an output voltage at an output (102) of said linear voltage regulator means, said output voltage achieved by smoothing the voltage at said switching means output; and
static starter means (82, 84, 30, 22, 86, 20, 26, 64, 90, 80) connected to said switching regulator means for inhibiting the switching of said third transistor (42) by holding said third transistor (42) in its conducting state until a predetermined voltage has built up on said first storage capacitor (14) and at said switching regulator means output (99).

13. The voltage supply circuit of claim 12 wherein said switching regulator means has a second storage capacitor (40) in parallel with said output (99).

14. The voltage supply circuit according to claim 12, wherein said starter circuit comprises:
a first initially inhibited transistor (22) and a second initially conducting transistor (30), both transistors (30, 22) being connected with their collector/emitter-paths in parallel to said first storage capacitor (14), a first voltage divider (20, 26, 28) and a second voltage divider (24, 86, 80, 82, 84, 22) whereat a portion of said first voltage divider (R5, R6, R7) is short-circuited to ground by said second storage capacitor when the voltage over said second storage capacitor (40) reaches a predetermined value thereby inhibiting said second transistor 30.

15. The voltage supply circuit according to claim 14, wherein the base of said third transistor (42) is controlled by collector/emitter-path of said second initally conducting transistor (30) and by the collector/emitter-path of a fourth transistor (54) arranged in parallel to said second transistor (30) and wherein said second transistor (30) serves to enable said third transistor (42) and said fourth transistor serves to inhibit said third transistor (42).

16. The voltage supply circuit according to claim 15, wherein said second transistor (30) is inhibited by means of a voltage divider (84, 82, 80, 86, 22, 26, 28) and said fourth transistor (54) is inhibited by the output signal of a comparator (62) which compares the voltage over said second storage capacitor (40) to a reference voltage.

17. The voltage supply circuit according to claim 16, wherein the series connection of a capacitor (130) and a resistor (132) is connected between the output and the inverting input of an amplifier (112).

* * * * *